Nov. 25, 1952 — R. A. McCONNELL — 2,618,968
SUPERSONIC TESTING APPARATUS
Filed May 6, 1946 — 3 Sheets-Sheet 1

INVENTOR
Robert A. McConnell

Patented Nov. 25, 1952

2,618,968

UNITED STATES PATENT OFFICE 2,618,968

SUPERSONIC TESTING APPARATUS

Robert A. McConnell, Emsworth, Pa.

Application May 6, 1946, Serial No. 667,701

15 Claims. (Cl. 73—67)

This invention relates in general to supersonic testing devices, and more particularly to supersonic pulse devices for checking the dimensions and surface condition of solid objects.

It is a purpose of this invention to provide apparatus for the rapid and precise checking of the dimensions and surface condition of solid objects by pulsed supersonics. Other purposes and advantages of this invention will be apparent from the following description.

In my co-pending application, Serial No. 647,591, filed February 14, 1946, now Patent No. 2,612,772, I have revealed devices for checking the dimensions and internal condition of a solid object by projecting supersonic pulses through said object and by subsequently canceling the transmitted energy of said pulses. In a preferred embodiment of that invention I would project pulses into a solid test object and simultaneously into a solid standard object and would cancel in time sequence and amplitude the transmitted echo train from said test object by the similar echo train from said standard object and by examination of the residual error of cancellation would discover any difference between said test and said standard objects.

My present invention deals for the most part with the external reflection of supersonic pulses from a test object, and, in a preferred embodiment, with the cancellation of an echo pulse train from a test object by the echo pulse train from a standard object so as to reveal any difference in dimensions and surface condition. While in my aforesaid co-pending application supersonic pulses are projected into a test object, in my present invention supersonic pulses are externally reflected from the surface of a test object. The instrument adjustments for such a reflection process are in general more simply and quickly made than for such a projection process. For this and other reasons which will be apparent from the hereinafter description, such a reflection process is sometimes to be preferred.

For a better understanding of the above indicated features of my invention and of others which will hereinafter appear, reference may be made to the accompanying drawings forming a part of this application wherein.

Figure 5:
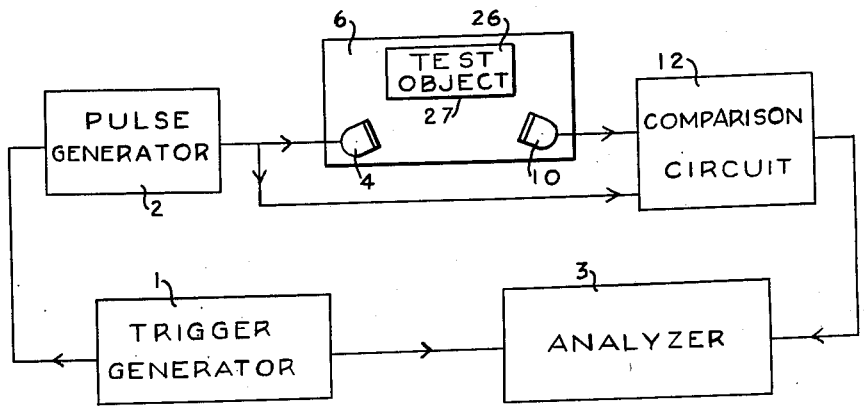
Figure 6:
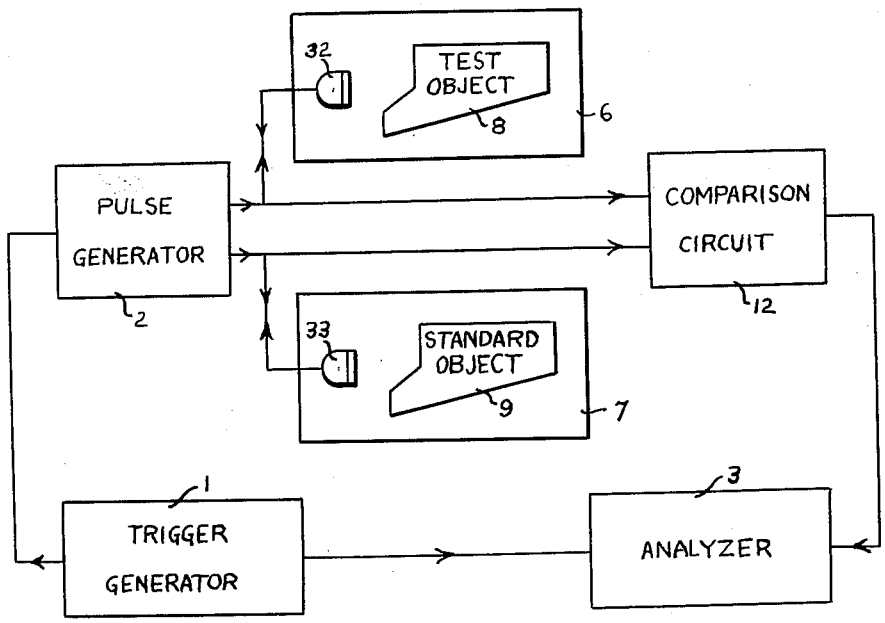
Figure 7:
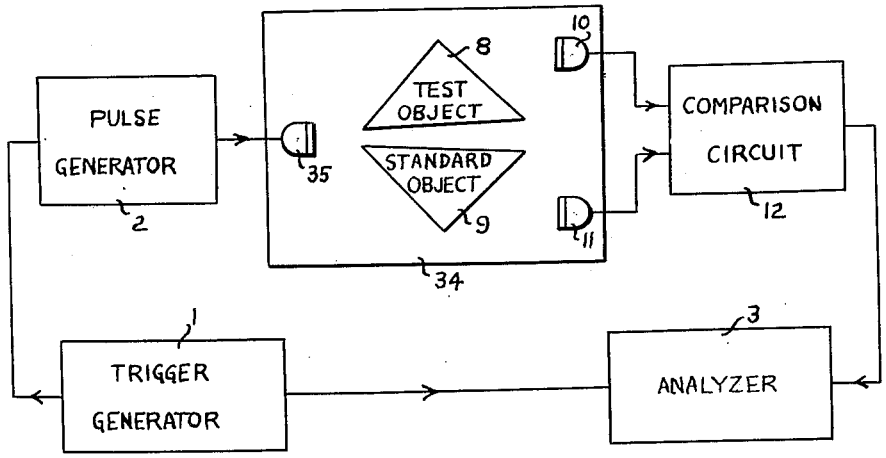

Figs. 5, 6, and 7 are alternate embodiments of this invention.

Figure 1:
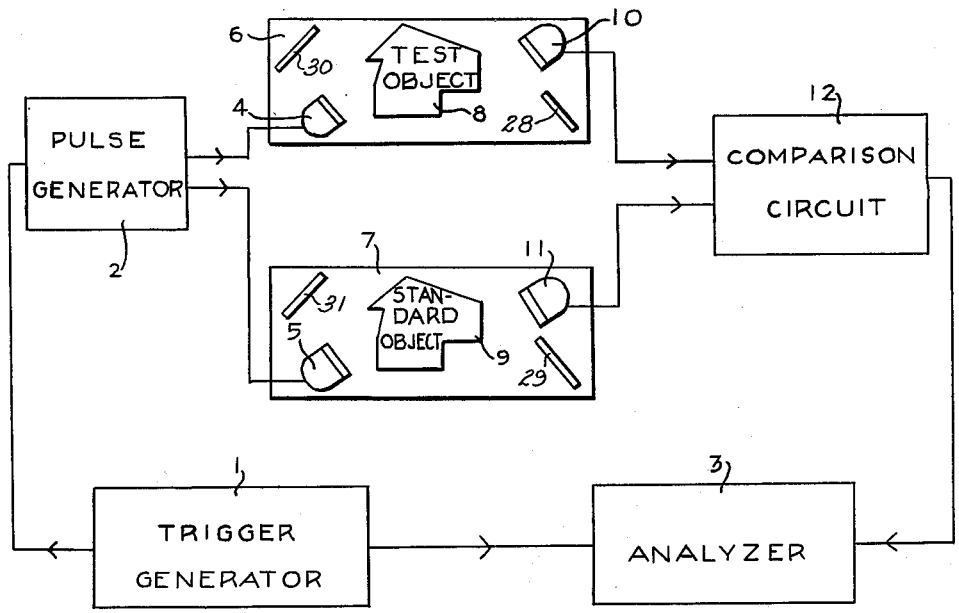
Fig. 1 is a block diagram of an embodiment of this invention.

The embodiment of my invention as shown in Fig. 1 includes a trigger generator or synchronizer 1, which feeds a pulse generator 2 and an analyzer 3. The pulse generator 2 comprises means for generating an approximately rectangular carrier or video pulse of electrical energy. This pulse is applied to electromechanical transducers 4 and 5 (such as suitably mounted piezoelectric quartz plates). The supersonic pulse generated by the transducer 4 travels through a suitable liquid medium (such as water, oil, or mercury) contained within a tank 6 and after possibly numerous reflections from a test object 8 and from the walls of the tank 6, the echoes of said supersonic pulse are picked up by an electromechanical transducer 10 and thereby converted into a train of electrical signals which are fed to a comparison circuit 12. Similarly the energy of the supersonic pulse generated by transducer 5 travels through the medium contained within tank 7 and after reflection from a standard object 9 and from the walls of the tank 7 is transduced by transducer 11 and fed to the comparison circuit 12. Within the comparison circuit 12 the electrical signal train from the test object receiving transducer 10 is canceled by the electrical signal train from the standard object receiving transducer 11. Any resulting difference signal, such as might be caused by a difference between a dimension of test object 8 and the corresponding dimension of standard object 9, is fed from the comparison circuit 12 to the analyzer 3 (such as a synchronized oscilloscope). The existence, the nature, and to some extent the magnitude of the discrepancy between the test object 8 and the standard object 9 may be inferred by analysis of said difference signal from comparison circuit 12.

The nature of the comparison circuit 12 will depend upon whether the output of the pulse generator 2 is a video pulse or a carrier pulse with a video pulse envelope. Moreover, if a carrier pulse is employed, the comparison circuit 12 may be designed to cancel each carrier cycle received from transducer 10 by the corresponding carrier cycle from transducer 11 or, alternatively, to cancel the video envelope of the carrier cycles from transducer 10 by the video envelope of the carrier cycles from transducer 11.

Figure 2:
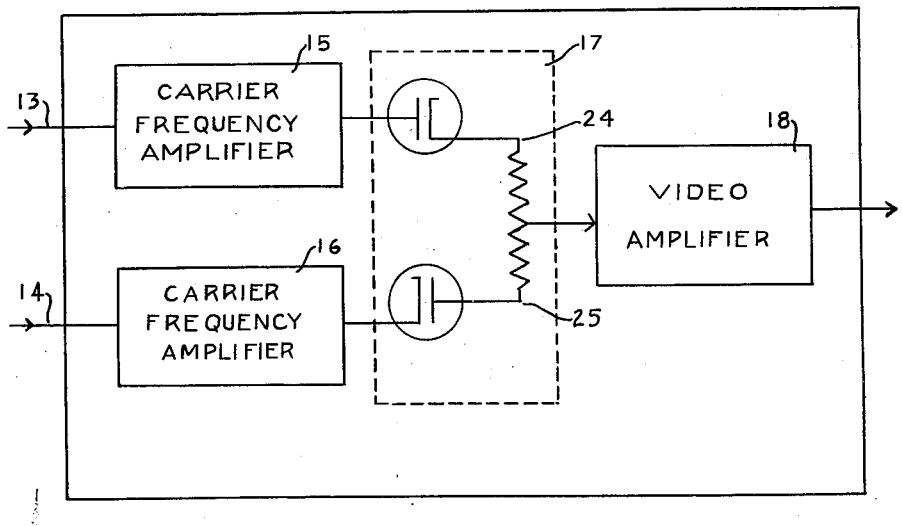
Fig. 2 is a block diagram of an embodiment of a part of this invention.
Figure 3:
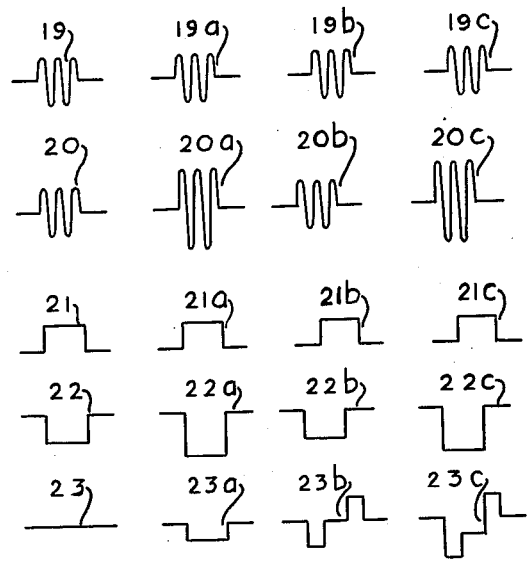
Fig. 3 shows certain voltage waveforms of various parts of Fig. 2.

The latter alternative is illustrated by Fig. 2 which is an embodiment of the comparison circuit 12. This circuit is composed of two identical carrier frequency amplifiers 15 and 16 whose inputs 13 and 14 are connected to transducers 10 and 11 respectively and whose outputs are connected to two balanced detectors 17. The output of detectors 17 may be further amplified by video frequency amplifier 18 and then applied to the analyzer 3. The action of the comparison circuit is best explained by reference to Fig. 3 which illustrates several possible wave forms which may result from a supersonic echo reflected by some particular path within tank 6 and from the corresponding echo reflected by a similar path within tank 7. Such an echo in the form of a short pulse of carrier frequency 19 from transducer 10 is applied to the input 13 of amplifier 15 and the corresponding echo in the form of a short pulse of carrier frequency 20 from transducer 11 is applied to the input 14 of amplifier 16. After amplification these pulses are fed to balanced detectors 17 which produce positive and negative video pulses, one polarity from each input. These video pulses are combined and the difference is applied to amplifier 18. If the two input pulses are the same amplitude and in the same time relationship as in the case of pulses 19 and 20, then the detector outputs 21 and 22 will be equal and of opposite polarity and the output 23 will be zero. If the two input pulses are of different amplitude as pulses 19a and 20a, the detector outputs will have different amplitudes as in 21a and 22a and there will be an output 23a whose polarity will depend upon which of the original pulses is the larger. If the two input pulses are not in the same time relationship, as pulses 19b and 20b, the detector outputs will be displaced as 21b and 22b and the output 23b will be a double pulse having positive and negative portions. If the input pulses are different in amplitude and time relationship as in 19c and 20c, then the output will be as 23c. Thus the analyzer will indicate the presence of any differences between the test object 8 and the standard object 9 which give rise to differences between the aforesaid particular path echo times or echo amplitudes. Similarly, any echoes arriving at transducers 10 and 11 by any other pair of corresponding paths may be analyzed to show differences between the test object 8 and the standard object 9.

Figure 4:
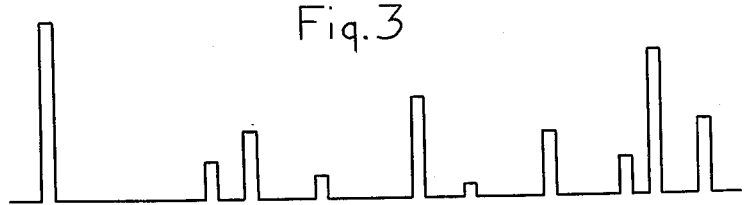
Fig. 4 is a certain voltage waveform of a point of Fig. 2.

A method of using the embodiment of the invention as shown in Figs. 1 and 2 would include the following steps. Precisely position a standard object 9 within tank 7 and a first test object 8, known to be identical with said standard object, within tank 6. Adjust the relative gain of amplifiers 15 and 16 so that all echoes cancel as seen on the analyzer 3. Remove aforesaid first test object 8 and replace with a second test object whose dimension or surface condition are uncertain. If the analyzer 3 shows zero output from comparison circuit 12 the second test object is identical with the standard object. A very accurate indication may be obtained of all the dimensions of the tested object if the transducers 4, 5, 10, 11 and objects 8 and 9 are placed within tanks 6 and 7 in such a way that there will be reflections or echoes from all the surfaces of the objects. As an example refer to Fig. 4. There is shown a typical idealized voltage waveform that would occur at point 24 of Fig. 2, the first pulse being the direct transmitted pulse and subsequent pulses the reflections from various surfaces upon which the supersonic energy may be incident. Depending upon the orientation of the transducers, the direct pulse may or may not be received. As explained before, if both objects are identical and the amplifiers are properly balanced, the voltage waveform of Fig. 4 as developed at point 24 of Fig. 2 will be canceled by a similar voltage waveform from point 25 of Fig. 2 and the analyzer will show a zero output. Any deviation between the objects will produce an unbalance in the amplifier and consequently an output. It is readily seen that each echo or reflection can be predicted from the contours of the object and from the orientation of the transducers and objects within the tanks and therefore a deviation in one dimension of the test object will cause certain reflections to change in time phase and/or amplitude. Furthermore a rough surface on the test object may reduce the amplitude of reflections therefrom. Thus with a calibrated chart such as Fig. 4 any indication appearing on analyzer 3 will show that a dimension is in error and approximately by how much and/or that the finish of a surface is smoother or rougher than the corresponding surface of the standard object.

Many modifications of the foregoing arrangements are possible. If, for example, hollow objects are to be compared, they may be filled with a suitable transmitting medium into which transducers 4, 10, 5, and 11 may be dipped, thus avoiding the use of tanks 6 and 7.

Although separate transducers 4 and 10 are shown in tank 6, it is possible as shown in Fig. 6 to use only a single transducer 32 for transmitting and receiving because the echo pulses need not in general be received during the time interval of pulse transmission. To preserve the similarity of the contents of tanks 6 and 7, the transducers 5 and 11 of tank 7 would be similarly replaced by a single transducer 33.

Two tanks 6 and 7 are shown in Fig. 1. One large tank 34 as shown in Fig. 7 might be used instead of two tanks, in which case it might be desirable to replace the transmitting transducers 4 and 5 with a single transducer 35 which might be located on a plane of mirror symmetry between the test object 8 and the standard object 9.

In any test arrangement, such as that of Fig. 1, the paths of the supersonic energy within the tanks 6 and 7 may be controlled and adjusted for optimum response of the analyzer 3 by means of baffles 28 and 29 and supersonic mirrors 30 and 31 located within tanks 6 and 7. To obtain desired paths of reflection from the test object 8 and standard object 9, the supersonic energy may be reflected not only from the walls of the tanks 6 and 7 but also from the bottoms of said tanks or from the free surface of the transmission medium within said tanks.

Although the shape of the envelope of the supersonic pulse has been described as rectangular in a preferred embodiment, it is evident that any shape of pulse may be used.

Furthermore, by choice of the physical parameters of the apparatus according to rules which are well known within the art, the supersonic pulse energy may be caused to travel from transducers 4 and 5 to transducers 10 and 11 either in a sharply defined beam or as a diffuse wave or indeed with any intermediate degree of definition. It will be evident that, whereas the number of paths effectively followed by the supersonic energy and hence the complexity of the echo pattern Fig. 4 will depend in part upon the definition of the supersonic beam, the precision of the determination of the similarity of test object and standard object will depend primarily upon the length of the supersonic pulse employed.

The reflections of energy from the test and standard objects and from other surfaces need not be complete. The energy leaving the transmission medium may be dissipated elsewhere or may later return to the transmission medium.

This suggests the use of special coatings upon the test object and standard object, or upon other surfaces. The use of lacquer over the test object is an example of the use of a coating which might be especially suitable with mercury as a supersonic transmission medium. The action of such a coating, depending upon its thickness and acoustic constants, may be to increase either the reflection or the absorption of energy incident thereupon. The use of such coatings may be advisable where it is desired to test the dimensions of an object without testing the finish, or to increase the reflection from a surface, or to suppress unwanted reflections, or to protect the test object from chemical reaction with the transmission medium.

In Fig. 5 is shown an embodiment of this invention which might be especially useful for testing the smoothness or grain of the surface of a solid object. A trigger generator or synchronizer 1 feeds a pulse generator 2 and an analyzer 3. The electrical output from pulse generator 2 is applied directly to one input of comparison circuit 12 and also to transducer 4. The supersonic pulse generated by transducer 4 travels in a beam within a suitable liquid medium contained within tank 6 to test object 26 where it is reflected by test surface 27 and directed toward transducer 10. The electrical pulse generated by transducer 10 is fed to a second input of the comparison circuit 12. The recurrence rate of trigger generator 1 is adjusted so that the period is just equal to the time taken by the supersonic pulse to traverse the reflection path between transducers 4 and 10 (or an integral sub-multiple of that time) so that a delayed and an undelayed pulse arrive at comparison circuit 12 at the same time. Said delayed and undelayed pulses may cancel one another within the comparison circuit 12 in the manner already described.

A method of testing using the embodiment of the invention as shown in Fig. 5 may include the following steps. Suitably position a standard object within tank 6. Adjust the frequency of trigger generator 1 and the gain of amplifiers 15 and 16 of Fig. 2 until the analyzer 3 shows zero output from the comparison circuit 12. Replace the standard object with a test object. If the analyzer 3 still shows zero output then the location and finish of the test surface 27 is identical with that of the standard object. If the analyzer 3 shows an output other than zero then the test surface 27 is improperly located or the finish is different from that of the standard object. Differentiation between a condition of improper location and a condition of improper finish of test surface 27 can be made in the manner already described according to whether the residual signal from the comparison circuit 12 shows lack of time coincidence or imperfect amplitude matching.

The invention described in the foregoing specification need not be limited to the details as shown, which are considered to be illustrative of forms the invention may take.

What is claimed is:

1. A supersonic test device comprising in combination, generator-projector means for creating corresponding electrical and mechanical pulses whose energy is at least predominantly at supersonic frequencies, said generator-projector means being placed to project mechanical pulses toward a nearby, spaced apart test object, transducing means located nearby but spaced apart from said test object so as to receive mechanical pulse energy from said test object and converting said mechanical pulse energy into electrical signals, said mechanical pulse energy having originally come from said generator-projector means in the manner described, a comparison circuit with two inputs, said circuit being adapted to provide an output indicative of differences between signals into said first input and signals into said second input, the first of said inputs being connected to said transducing means, and pulse energy transmitting means receiving pulse energy from said generator-projector means and delivering to said second input of said comparison circuit electrical signals which are related to said pulses from said generator-projector means in such a way as to cancel in said comparison circuit the signals from said transducing means when said test object shall have its surface in a predetermined locus and condition.

2. A test device as in claim 1 wherein said pulse energy transmitting means comprises second and third transducing means located nearby but spaced apart from a standard object, said second transducing means being connected to said generator-projector means so as to receive said electrical pulses from said generator-projector means and being placed to project mechanical pulses corresponding to said electrical pulses toward said standard object, said third transducing means being arranged to receive mechanical pulse energy from said standard object and to convert the last said mechanical pulse energy into electrical signals, the last said mechanical pulse energy having originally come from said generator-projector means via said second transducing means and said standard object in the manner described, said second transducing means and said standard object and said third transducing means all being place relative to one another in a manner similar to the relative placement of said generator-projector means and said test object and the first aforesaid transducing means so that the signals from said third transducing means will cancel in said comparison circuit the signals from the first aforesaid transducing means when said test object shall have its surface in a predetermined locus and condition corresponding to the locus and condition of the surface of said standard object.

3. A test device as in claim 1 wherein said pulse energy transmitting means is an electrical connecting wire from said generator-projector means to said second input of said comparison circuit.

4. A test device as in claim 1 wherein said pulse energy transmitting means is an electrical connecting wire from said generator-projector means to said second input of said comparison circuit and wherein the interval between pulses from said generator-projector means is substantially equal to the time required for mechanical energy to travel from said generator-projector means to said test object plus the time required for mechanical pulse energy to travel from said test object to said transducer.

5. A test device as in claim 1 wherein said generator-projector means includes said transducing means, said combination generator-projector and transducing means being arranged to project mechanical pulses toward said test object in the manner described and to receive in the intervals between the projection of said pulses mechanical pulse energy having originally come from said combination means in the manner described, and wherein said pulse energy transmitting means comprises second transducing means located nearby a standard object, said second transducing means being connected to said combination means so as to receive said electrical pulses, said second transducing means being placed to project mechanical pulses corresponding to said electrical pulses toward said standard object and to receive in the intervals between the projection of last said mechanical pulses mechanical pulse energy returned from said standard object, said second transducing means converting said last mentioned mechanical pulse energy into electrical signals, said last mentioned mechanical pulse energy having originally come from said combination means via said second transducing means in the manner described, said second transducing means being connected to said second input of said comparison circuit and delivering to said second input the last mentioned electrical signals, said second transducing means and said standard object being placed relative to each other in a manner similar to the relative placement of the first aforesaid transducing means and said test object so that said electrical signals produced in said second transducing means will cancel in said comparison circuit said electrical signals produced in the first aforesaid transducing means when said test object shall have its surface in a predetermined locus and condition corresponding to the locus and condition of the surface of said standard object.

6. A test device as in claim 1 wherein said generator-projector means is arranged to project mechanical pulses simultaneously toward a nearby standard object and wherein said pulse energy transmitting means comprises second transducing means arranged nearby said standard object so as to receive mechanical pulse energy from said standard object and converting said last-mentioned mechanical pulse energy into electrical signals, and said last-mentioned mechanical pulse energy having originally come from said generator-projector means in the manner described, said generator-projector means and said standard object and said second transducing means all being placed relative to one another in a manner similar to the relative placement of said generator-projector means and said test object and the first aforesaid transducing means so that the signals from said second transducing means will cancel in said comparison circuit the signals from said first aforesaid transducing means when said test object shall have its surface in a predetermined locus and condition corresponding to the locus and condition of the surface of said standard object.

7. A test device as in claim 1 comprising additionally in combination, mirrors placed to direct mechanical pulse energy most effectively to and from said test object and baffles arranged to deflect and absorb unwanted mechanical pulse energy flowing in the vicinity of said test object.

8. A supersonic test device comprising in combination, generator-projector means for creating carrier frequency pulses, said generator-projector means being placed to project in mechanical form at least a part of the energy of said pulses toward a nearby, spaced apart test object, transducing means located nearby but spaced apart from said test object so as to receive mechanical pulse energy from said test object and converting the last-mentioned mechanical pulse energy into electrical signals, said last-mentioned mechanical pulse energy having originally come from said generator-projector means in the manner described, a comparison circuit with two inputs, said circuit being adapted to rectify the signals received at said inputs and to provide an output indicative of differences between the envelope of signals into said first input and the envelope of signals into said second input, the first of said inputs being connected to said transducing means, and pulse energy transmitting means coupled to said generator-projector means and receiving pulse energy therefrom and delivering to said second input of said comparison circuit pulse energy which is related to the last aforesaid pulse energy in such a way as to cancel in said comparison circuit the signals from said transducing means when said test object shall have its surface in a predetermined locus and condition.

9. A supersonic test device comprising, a source of electrical pulses, first and second electromechanical transducers placed near a test object and separated therefrom by an elastic medium such as air or water, said first transducer being coupled to said source and converting electrical pulses from said source into mechanical pulses within said medium and directing said mechanical pulses so that at least a portion of the energy of said mechanical pulses is incident upon said test object, said second transducer receiving mechanical pulses from said medium and converting said received mechanical pulses into corresponding electrical signals, said received mechanical pulses having been redirected at least in part by said test object, signal combining means having first and second inputs thereto, said first input being coupled to said second transducer, said combining means being adapted to provide an output signal indicative of selected differences between signals into said first input and signals into said second input, and means coupling said source of pulses to said second input of said signal combining means in such a way as to cause no indicative output from said combining means when said test object redirects said incident pulse energy in a predetermined manner.

10. A test device as in claim 9 wherein said means coupling said source of pulses to said second input of said signal combining means comprises in combination third and fourth electromechanical transducers placed near a standard object and separated therefrom by an elastic medium, said third transducer being coupled to said source and converting electrical pulses from said source into mechanical pulses within last said medium and directing last said mechanical pulses so that at least a portion of the energy of last said mechanical pulses is incident upon said standard object, said fourth transducer receiving mechanical pulses from last said medium and converting last said received mechanical pulses into corresponding electrical signals, last said received mechanical pulses having been redirected at least in part by said standard object, said third and fourth transducers and said standard object having a relative location corresponding to the relative location of said first and second transducers and said test object, and the last said medium corresponding in supersonic properties to the first said medium, all whereby said combining means will provide no indicative output when said test object redirects said thereupon incident pulse energy in a manner predetermined by said standard object.

11. A supersonic test device comprising, a source of electrical pulses, first and second electromechanical transducers placed near a test object and separated therefrom by an elastic medium, said first transducer being coupled to said source and converting electrical pulses from said source into mechanical pulses within said medium and directing said mechanical pulses so that at least a portion of the energy of said mechanical pulses is incident upon said test object, said second transducer receiving mechanical pulses from said medium and converting said received mechanical pulses into corresponding electrical signals, said received mechanical pulses having been redirected at least in part by said test object, the interval between pulses from said source of electrical pulses being substantially equal to the time required for mechanical pulses to travel from said first transducer to said test object plus the time required for the redirected part of said received mechanical pulses to be redirected by said test object in the manner aforesaid and to travel to said second transducer, signal combining means having first and second inputs thereto, said first input being coupled to said second transducer, said combining means being adapted to provide an output signal indicative of selected differences between signals into said first input and signals into said second input, and means coupling said source of pulses to said second input of said signal combining means in such a way as to cause no indicative output from said combining means when said test object redirects said incident pulse energy in a predetermined manner.

12. In combination, generator-projector means directing supersonic pulses toward a nearby test object and toward a nearby standard object, nearby electromechanical transducers receiving supersonic echoes from said objects arising from said pulses, the relationship between said test object and the source of said supersonic pulses directed toward said test object and the point of reception of said supersonic echoes from said test object being geometrically symmetrical to the relationship between said standard object and the source of said supersonic pulses directed toward said standard object and the point of reception of said supersonic echoes from said standard object, an electronic circuit connected to said transducers so as to receive the transduced echoes from said objects, said circuit being adapted to indicate the instantaneous difference if any between said transduced echoes and thereby a difference if any between said test and said standard objects.

13. A supersonic test device comprising in combination an electrical pulse generator, first and second electromechanical transducers arranged in the vicinity of a test object, said first transducer converting electrical signals from said pulse generator into mechanical signals traveling to said object and said second transducer receiving mechanical echoes from said object caused by the aforesaid mechanical signals and converting said echoes into corresponding electrical signals, the interval between pulses from said pulse generator being substantially equal to the time required for mechanical signals to travel from said first transducer to said test object plus the time required for mechanical echoes to travel from said test object to said second transducer, and an amplifier receiving electrical signals from said pulse generator and from said second transducer and providing an output indicative of the instantaneous difference between the last aforesaid signals whereby the surface location and condition of said test object may be determined.

14. A supersonic test device comprising in combination, an electrical pulse generator connected to first and second electromechanical transducing means, said first transducing means being placed near a test object and arranged to convert electrical pulses from said generator into mechanical pulses and to direct said mechanical pulses toward said test object and to receive mechanical pulse energy returned from said test object and to convert said returned mechanical pulse energy into electrical signals, said returned mechanical pulse energy having originally come from said generator in the manner described, said second transducing means being placed near a standard object in a manner similar to the placement of said first transducing means near said test object and arranged to convert electrical pulses from said generator into mechanical pulses and to direct the last said mechanical pulses toward said standard object and to receive mechanical pulse energy returned from said standard object and to convert the last said mechanical pulse energy into electrical signals, the last said mechanical pulse energy having originally come from said generator in the manner described, a comparison circuit having first and second inputs, said first input being connected to said first transducing means and said second input being connected to said second transducing means, said comparison circuit being adapted to provide an output indicative of differences between signals entering said first and second inputs, all whereby said comparison circuit will provide an indication of differences, if any, between the locations and mechanical pulse energy directing properties of said standard and said test objects.

15. Apparatus for inspecting and measuring a test object comprising in combination, means for generating a supersonic wave train, means for simultaneously directing said wave train toward said test object and in a geometrically similar manner toward a standard object, means in the vicinity of said test object for receiving from said test object a second wave train resulting from the incidence of said first wave train upon said test object, means in the vicinity of said standard object for receiving from said standard object a third wave train resulting from the incidence of said first train upon said standard object, said receiving means being located in a geometrically similar manner with respect to said test object and said standard object, and means for combining said second and third wave trains, said last-mentioned means providing an output signal indicative of differences if any between said second and third wave trains and thereby indicative of differences if any between said test and said standard objects.

ROBERT A. McCONNELL.

REFERENCES CITED

The following references are of record in the file of this patent:

UNITED STATES PATENTS

| Number | Name | Date |
|---|---|---|
| 2,010,189 | Hallowell | Aug. 6, 1935 |
| 2,216,949 | Kellogg | Oct. 8, 1940 |
| 2,280,226 | Firestone | Apr. 21, 1942 |
| 2,378,237 | Morris | June 12, 1945 |
| 2,394,461 | Mason | Feb. 5, 1946 |
| 2,527,208 | Berry et al. | Oct. 24, 1950 |

FOREIGN PATENTS

| Number | Country | Date |
|---|---|---|
| 232,929 | Switzerland | Sept. 16, 1944 |